Nov. 4, 1969

G. C. DEVOL 3,476,266

BINARY-CODE CONTROLLED APPARATUS

Filed Nov. 28, 1967

G. C. DEVOL 3,476,266

BINARY-CODE CONTROLLED APPARATUS

Filed Nov. 28, 1967

United States Patent Office 3,476,266
Patented Nov. 4, 1969

3,476,266
BINARY-CODE CONTROLLED APPARATUS
George C. Devol, 990 Ridgefield Road,
Wilton, Conn. 06897
Filed Nov. 28, 1967, Ser. No. 686,111
Int. Cl. B25j 9/00; F01b 7/16; F15b 15/22
U.S. Cl. 214—1                                     22 Claims

ABSTRACT OF THE DISCLOSURE

Actuating apparatus for driving the parts of a machine, such as a program-controlled article transfer unit, utilize a series of fluid-pressure actuators each having an extended state and a contracted state and operable in various combinations for providing drive output by collectively changing in overall size. The actuators generally have strokes of different lengths. At the start of each change from one combination to another, there is a transition period during which some actuators tend to contract while others are expanding, often at different rates and times. Erratic operation of the apparatus during such transition periods is avoided by including a brake that prevents changes in the collective size of the group of actuators during the transitions. Where double-acting actuators are used, the brake used is one that responds to the build-up of ample pressure signifying completion of the movements of all actuators going in one direction. Thereafter the other actuators drive the output device without vacillation.

---

The present invention relates to apparatus for moving a mechanical output or work device to a succession of positions under binary-code control, especially apparatus that executes such code-controlled motions in multiple degrees of freedom. For example, an X–Y table involves controlled operations in two degrees of freedom, each being in a straight-line. Controlled rotational or arcuate motions represent other degrees of freedom, and where multiple degrees of freedom are involved they may be straight-line or rotational motions, or motions of both types may be executed in the several degrees of freedom.

The invention is especially applicable to article-transfer apparatus that operates either under manual control or under program control, where the apparatus may need the capacity to exert large forces in moving a substantial load to the required sequence of positions.

The invention utilizes a type of mechanical driving means in which there are many small individually controlled actuators operable in selected combinations to move a mechanical output device to a succession of desired positions. Each actuator operates through a precise stroke in changing from a retracted state to an extended state, or the reverse. The combined strokes of the actuators provide any desired part of the total stroke of the mechanical output device. A separate group of actuators is used in each degree of freedom.

Some of the actuators are in their extended states while others are in the retracted state when the work device is in an intermediate position of its range. In operating the work device to any other position, some of the extended actuators may become retracted and some retracted actuators become extended. Individual actuators tend to operate at different rates and at slightly different times due to various factors. For example, actuators that have short strokes complete their operation while long-stroke actuators are still in operation. Accordingly, this type of operating means tends to operate in a somewhat erratic back-and-forth or vacillating motion as it drives from one coded position to the next.

An object of the present invention is to stabilize the operation of the foregoing type of group actuators for mechanical output or work devices. It is an important object of the invention to stabilize such group actuators when used for developing large forces and where reverse forces imposed on the apparatus by a load may be considerable.

A further object of the present invention resides in providing a novel stabilized mechanical operator that is directly responsive to binary-code control, avoiding the complications of digital-to-analog converters, servos and the like.

An object related to the foregoing objects resides in providing binary-code program-controlled apparatus having plural operators in plural degrees of freedom, respectively, each operator having plural actuators that respond directly to the binary code programs, and wherein each multiple-actuator operator is at least largely immune to erratic operation or vacillation during travel of the work device from each position to a new position.

The foregoing objects and others are achieved by the embodiments of the invention shown in the accompanying drawings and described below in detail. The apparatus includes a group of actuators that is operable under manual binary-code control in a preliminary "teaching" mode and later in a binary-code automatic memory-controlled mode. This fundamental sequence of "teach"-and-"operate" type of program control is highly desirable. Various forms of such apparatus are described, for example, in my Patents Nos. 3,251,483, 3,279,624 and 3,283,918.

The actuators of each group respond to corresponding bits of the control code, there being one bit in the code corresponding to each actuator to be controlled. The lengths of stroke of the various actuators are advantageously related in a progression such that one actuator can execute half the total stroke of the group, another actuator can execute one-quarter of the total stroke, a third can execute one-eighth of the total, etc. In that case, a binary digital code may be used to effect progressively larger displacements. In any case, the bits of the code control corresponding to actuators, without resort to complicating digital-to-analog converters, computer circuits, and the like.

In changing from one configuration to another in response to each new control code combination, some actuators of a group may remain retracted, others may remain extended, some extended actuators may retract, and some retracted actuators may become extended. As already mentioned, there is a tendency of the work device that is moved by this group of actuators to "jitter" or vacillate as it advances to its new position. This instability is cured in the presently preferred embodiment of the invention by arresting or restraining the output end of the group of actuators until the net direction of drive of the group of actuators has been resolved. At this time, the actuators that have not yet completed their driving strokes all act in the same direction and develop a greatly increased driving force. A brake or restraining device is provided that prevents reverse operation of the work device by its load before the increase in driving force develops. Thereafter, the increased force is effective to overpower or to release the brake and to move the work device with its load in a direct stroke from the starting position to the desired new position. Where multiple groups of actuators are used in multiple degrees of freedom, the release of all the brakes can be time-delayed to start the motions in all degrees of freedom concurrently. Preferably, however, means is provided to release positive-acting brakes in all degrees of freedom only when all groups of actuators have resolved their directions of drive.

The foregoing represents an efficient apparatus of relatively modest cost and of simple, reliable construction. Remote-controlled motions and program-controlled motions may be executed accurately and in comparatively rapid sequence.

The nature of the invention including the foregoing and other objects and novel features, and its advantages, will be more fully appreciated from the following discussion in detail of an illustrative embodiment and modifications thereof. These are shown in the accompanying drawings, which form part of the disclosure.

Figure 1:
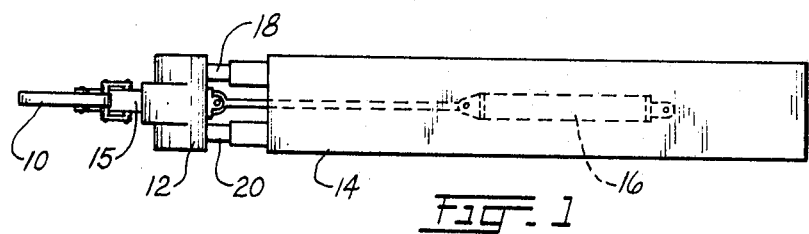
FIGURE 1 is a plan view of the upper part of an article transfer apparatus improved through the use of the invention.
Figure 2:
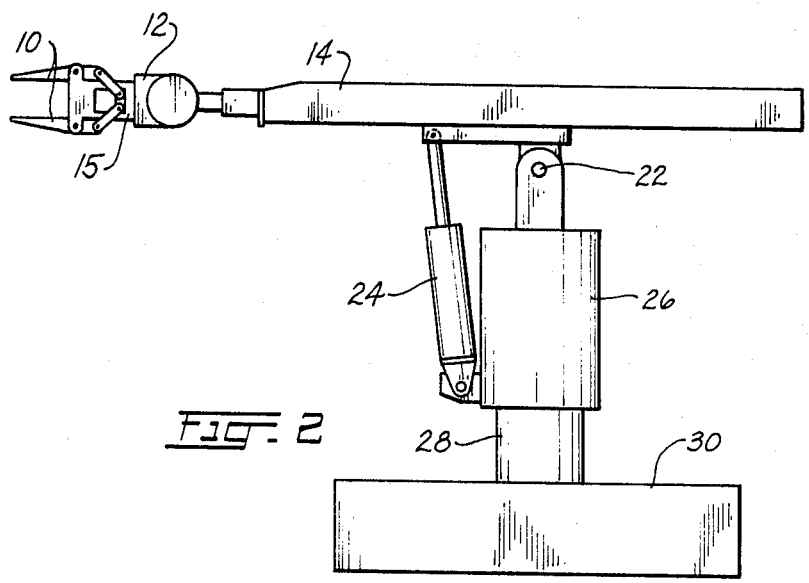
FIGURE 2 is an elevation of the article transfer apparatus of FIG. 1.

FIGS. 1 and 2 illustrate article transfer apparatus generally of the type found in my patents mentioned above. Article-gripping jaws 10 are carried by head 12, which contains a fluid-actuated piston to close and open the jaws. Head 12 is carried by arm 14 that contains an operating unit 16 for operating head 12 radially outward and back, as required. Head 12 contains suitable gearing to swing jaws arcuately about the axis of the cylindrical part of head 12 is a "wrist-bend" motion; and gearing in head 12 also rotates part 16 of the head about an axis that extends midway between jaws 10, in a "twist" motion. The details of suitable gearing of this form appear in my Patent No. 3,306,471. Shafts 18 and 20 are splined and they telescope into arm 14 to extend from respective operating units (not shown) to the "twist" and "wrist-bend" gearing in head 12.

Arm 14 is moved about the horizontal axis of pivot 22 by operating unit 24. A shell 26 is part of a rotatable post that supports arm 14 and operating unit 24 for rotation about a vertical axis. The rotatable post extends through internal bearings in stationary tube 28 and base 30. An operating unit (not shown) is contained in base 30 for rotating arm 14 about the vertical axis of its supporting post.

Jaws 10 are thus seen to be operable in five degrees of freedom: wrist-bend, twist, radial in-and-out motion along arm 14, arcuate motion about pivot 22 and rotation about the vertical axis. For simplicity of illustration, only two operating units 16 and 24 are shown, but it is understood that operations in any or all of the five degrees of freedom may be executed by operating units described below, arranged generally as shown in my Patent No. 3,306,471.

Figure 3:
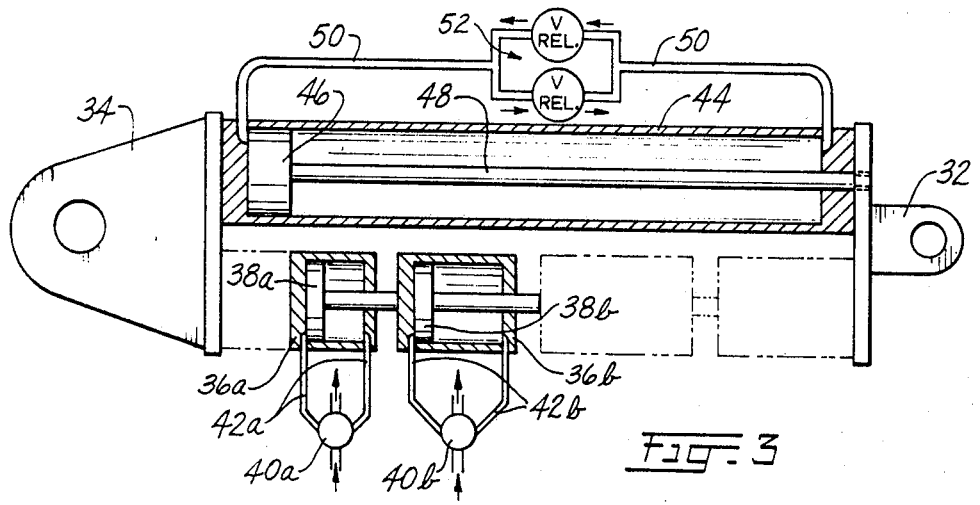
FIGURE 3 is a fragmentary lateral view, partly in cross-section, of an operating unit forming part of the apparatus in FIG. 1.

FIG. 3 shows a presently preferred form of an operating unit or driving means 16 and 24. End parts 32 and 34 of this driving means may be called the work output end and the reference end of the unit. A series of cylinders 36a, 36b . . . are suitably supported and guided between end parts 32 and 34. A piston 38a in cylinder 36a has a rod that is fastened to the next cylinder 36b. Piston 38b in cylinder 36b has its rod fixed to the next cylinder of the series, and so on. A four-way solenoid-actuated valve 40a connects one line 42a to a high-pressure hydraulic fluid supply line and connects the other line 42a to a "dump" or discharge line. Depending on which side of piston 38a is exposed to high-pressure fluid, piston 38a moves to the left or to the right and is forced to remain in such position. Actuators 36a–38a correspondingly assumes and remains in its retracted state or its extended state.

The operating stroke of actuators 36a–38a is controlled by the precisely established clearance space in cylinder 36a that provided for piston 38a. Each of the other actuators of the series also has a precisely established operating stroke. Advantageously, one actuator has a stroke equal to half of the maximum of the operating unit, another actuator has a stroke of one-quarter of the maximum, a third actuator has a stroke of one-eigth of the maximum, and so on for as many actuators as are used. In this case, a binary digital control means for valves 40 will correspondingly move output part 32 progressively to digitally related positions. In turn, where each of operating units 16 and 24 incorporates a group of actuators 36a–38a . . . , those operating units drive jaws 10 as a mechanical output device to digitally related positions in each of two ranges, representing coordinates in two illustrative degrees of freedom. One of these is a linear motion and one is an arcuate motion in the apparatus of FIG. 2. Two rectangularly related motions would be similarly executed as in article-transfer apparatus having a straight-line vertical motion and a straight-line arm-extending and arm-retracting motion as in my Patent No. 2,988,237.

As many actuators are used as are needed for achieving the desired accuracy, which is limited by the stroke of the smallest actuator. For example, if ten actuators are used having hydraulic cylinders of equal diameter in a column as shown in FIG. 3, starting with a $\frac{1}{16}$ inch-stroke actuator and doubling in size for the next actuators, successively, a total stroke of 64 inches is realized.

A restraining device which may be called a hydraulic brake acts between parts 32 and 34 of the operating unit in FIG. 3. The brake includes cylinder 44 fixed to end 32, piston 46, and rod 48 that is fixed to piston 46 and to end part 34. Lines 50 extend to opposite ends of cylinder 44 and communicate with each other through valve 52. So long as valve 52 is closed, brake 44–46–48 is locked. To special advantage, valve 52 contains two oppositely directed pressure-relief valve portions. These are designed and adjusted to open when some of the actuators 36–38 have reached their extended or retracted states (determined by the selective setting of their valves 40) and all of the remainder of the actuators are acting in a common direction, toward their retracted states or toward their extended states. So long as any two of the actuators are in motion in opposite directions, the force exerted by the actuators between end parts 32 and 34 tends to be relatively low. The pressure in cylinder 44 due to the action of two opposite-acting actuators tends to be limited, even if one of the larger-stroke actuators should move faster than the others and thus applies some force between the ends 32 and 34 of the operating unit. The apparatus itself and the article carried by jaws 10 also develops a force that acts between end parts 32 and 34. The pressure-relief level of valve 52 is set at a high level, e.g. half of the hydraulic pressure supply where piston 46 has the same diameter as pistons 38, to prevent motion of piston 46 in cylinder 44 when acted on by such limited forces. However, the pressure rises enormously when the only actuators that have not completed their strokes are all operating in a common disection. Such a rise in pressure opens valve 52, thus releasing the brake. In a sense the brake has been overpowered by the actuators operating in a common direction. The pressure-relief valves represent an automatic pressure-responsive brake-releasing arrangement that can be accurately adjusted and maintained with stability. The brake forestalls erratic or random operations of output part 32 relative to reference part 34 (e.g. the lower end of operating unit 24) due to operation of individual actuators 36–38 in diverse directions, thus stabilizing the operating unit of FIG. 3.

Figure 7:
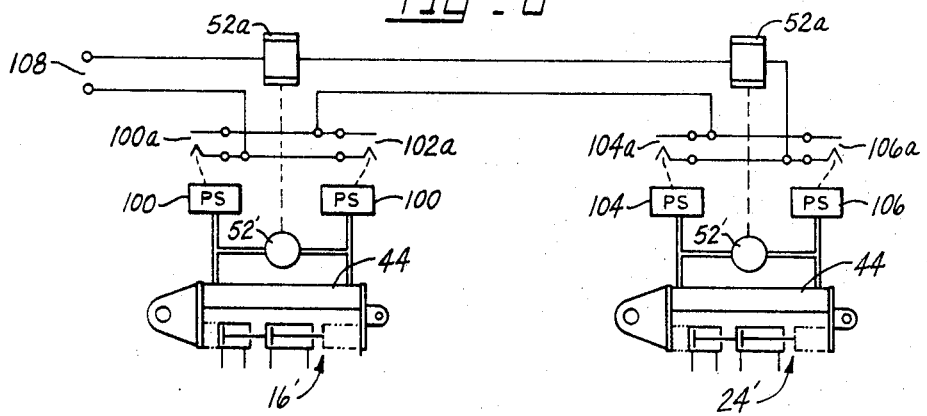
FIGURE 7 is a further modification of the apparatus of FIG. 3, including two operating units for the apparatus of FIGS. 1 and 2.

The location of dual pressure-relief valve 52 as shown is advantageous, since it is accessible for adjustment and it is made of commercially available pressure relief valves acting in opposite directions. However, such valves could be built into the body of piston 46. As another alternative, a friction brake could be employed. Such a brake could be in effect at all times, to be overpowered during operating strokes, or it may be arranged to be released under control of a pressure sensor, as shown in FIG. 7 and described below.

Figure 5:
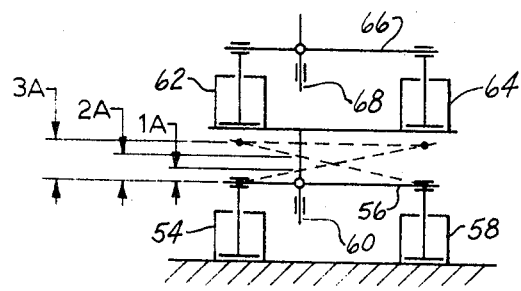
FIGURE 5 is a diagram of a modified portion of FIG. 3.

Actuators 36–38 are illustrated in simple columnar alignment in FIG. 3. FIG. 5 shows another arrangement of actuators that act together without being in mutual alignment. Actuator 54 comprising a piston-and-cylinder unit acts on one end of a lever 56 while actuator 58 acts on the other end of the lever. Actuators 54 and 58 have the same length of stroke. A rod 60 in a suitable slide guide is pivoted to lever 56 at a point one-third of the length from actuator 54 to actuator 58. The full stroke of actuator 58 would move rod 60 through a one-unit stroke; the full stroke of actuator 54 alone would move rod 60 two such units, while the full strokes of both actuators 54 and 58 would move rod 60 through a distance of three units. Two more actuators 62 and 64 carried on rod 60 may each have twice the stroke of actuators 54 and 58. They operate on a lever 66 to shift a rod 68 in a slide guide. The pivot of lever 66 is located at a point one-third of the lever length from actuator 62 and two-thirds of the lever length from actuator 64. Actuators 54, 58, 62 and 64 act cumulatively to produce a controlled displacement, and may be substituted for the simple column of actuators 36–38 in FIG. 3. Additional actuators may be included, as needed.

Figure 4:
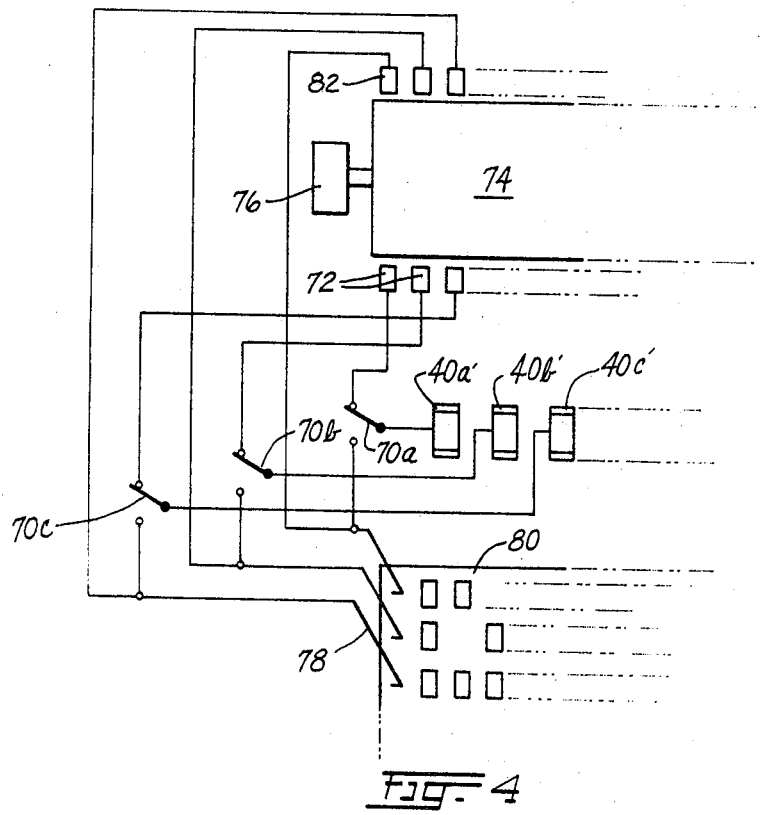
FIGURE 4 is a diagram showing program control means for the operating unit of FIG. 4.

Apparatus for controlling valves 40 of the actuators in FIG. 3 is shown in FIG. 4. Valve solenoids 40a', 40b', 40c', etc. are shown connected by switches 70a, 70b, 70c . . . to corresponding sensing units 72. These include sense-at-rest magnetic detectors opposite a row of combination-code control recordings on drum 74. As many groups of sensing units 72 are used as there are groups of actuating units. A suitably controlled indexing drive unit 76 advances drum 74 to successive combination-code recordings, to cause the operating unit of FIG. 3 and others like it in the apparatus of FIG. 2 to execute a sequence of program-controlled motions.

Switches 70 may be operated manually to the position opposite to that shown. With such a setting, switches 70 connect valve solenoids 40' to brushes 78 opposite manually operable combination code device 80. Switches 70 also connect recording heads 82 to brushes 78. Manual operation of unit 80 will then energize the solenoid valves in binary-code combinations and cause operation of the operating unit of FIG. 3. Other multiple-actuator operating units may be operated by other manual combination-code devices 80. The apparatus of FIGS. 1 and 2 may thus be operated under manual control by combination code-signals transmitted to the valve solenoids. The manual controls may be located at a remote point, relative to the controlled apparatus.

The present purpose of the switch 70, manual control 80 and recording units 82 is to provide for preliminary operation of the apparatus under manual control in a "teach" mode. Each time a significant position is reached by the apparatus when manually controlled, a control (not shown) is operated to produce a recording pulse in the selected recording heads 82 according to the setting of encoding switch 80. Drum 74 is indexed a step at a time after each combination-code recording, to provide a program of codes. Reversing switches 70 to the position shown in FIG. 4 then places sensing heads 72 in control of valve solenoids 40' as described previously, in the "operate" mode.

Figure 6:
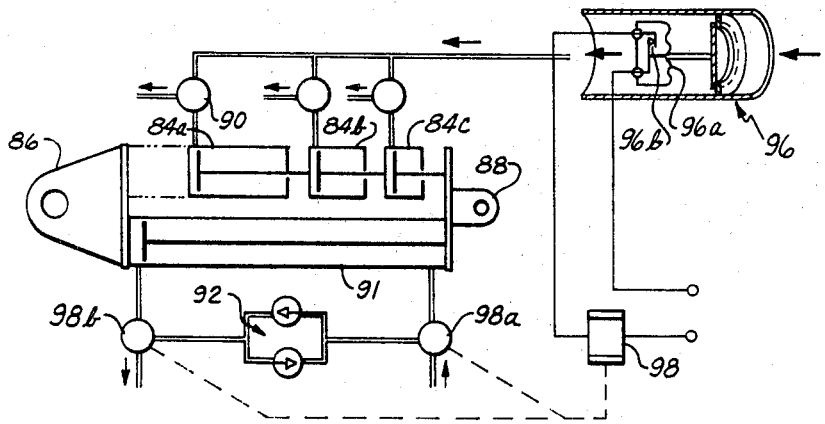
FIGURE 6 is a diagram of a modification of the operating unit of FIG. 3.

Actuators 36–38 are double-acting, that is, they provide driving force in either desired direction. In FIG. 6 a modification is shown in which there is a row of single-acting actuators 84, aligned between end parts 86 and 88 corresponding to end parts 32 and 34 of the operating unit in FIG. 3. Solenoid valves 90 are arranged either to "dump" or vent actuators 84, or to connect the actuators to a fluid pressure supply in accordance with coded control by drum 74 or switch 80. A hydraulic brake including a piston-and-cylinder unit 91 secured between end parts 86 and 88 has a double-acting pressure relief valve 92 like valve 50 described above. Actuators 84 act to provide driving force only in the direction to extend the actuators, to drive end parts 86 and 88 away from each other. Piston-and-cylinder unit 91 is here used additionally as a driving unit acting on end parts 86 and 88, to force all units 84 to collapse which are not connected by their valves 90 to the high pressure supply. This change of unit 91 from its initial use as a brake to its use as a driver is made by valves 98a and 98b. Initially these valves connect the ends of unit 91 to dual valve 92. Valves 98a and 98b are held in that condition by a normally energized solenoid 98. When solenoid 98 is deenergized, valve 98a connects one end of unit 91 to a fluid pressure supply and valve 98b vents the other end of unit 91. By proper proportions of pressure and cylinder sizes, unit 91 acting as a driver exerts less force than actuators 84 and is caused to clamp end parts 86 and 88 to the ends of the column of actuators 84 without collapsing any of those actuators that are valved to the high-pressure fluid supply.

A fluid-flow switch 96 is provided with a diaphragm 96a that closes contacts 96b when high-pressure fluid stops flowing, or nearly stops. Contacts 96b deenergize solenoid 98a of solenoid valve 98 to cause driver 91 to operate as soon as all pressurized actuators 84 have completed their strokes.

In case end parts 86 and 88 are initially too close together to allow full-stroke operation of the pressurized actuators 84, those actuators will force valve 92 to release brake 91, extending the operating unit. Thereafter valve 98 is operated to pressurize driver 91, but in this assumed condition, driver 91 does nothing.

In case end parts 86 and 88 are initially farther apart than is required by the actuators 84 as selectively extended under control of valves 90, brake 91 restrains the operating unit between end parts 86 and 88 from change. When switch 96b closes, solenoid valve 98 pressurizes driver 91 to draw end parts 86 and 88 in the sense of a clamp against the column of selectively extended actuators 84. Of course, the brake and the driver functions can be executed by two separate cylinder units, in which case the driver, when operated by closure of switch 96, would serve as an actuator and would exert ample force to release brake 92, and to operate the working end of the unit carrying a load. In any case, driver 91 exerts less than enough force to collapse any of the selectively pressurized and extended actuators 84 which, though they are single-acting, determine the position of the mechanical output end of the operating unit in FIG. 6.

Operating units 16 and 24 may be constructed as shown in FIG. 3. FIG. 7 shows two operating units 16' and 24' like FIG. 3, but modified in certain particulars. The parts whose construction and operation are the same in FIG. 7 as in FIG. 3 are not described here, for conciseness. In lieu of dual pressure-relief valves 52, normally closed solenoid valves 52' are provided in the embodiment of FIG. 7. Operating unit 16' has two pressures switches 100 and 102, which have their contacts 100a and 102a connected in parallel with each other. These pressure switches are exposed to the pressures in the respective lines from the ends of the hydraulic brake cylinder 44 to valve 52'. Switch 100 or switch 102 closes only when the pressure is high enough to warrant releasing the brake, by opening valve 52' so that there is a free passage for the flow of fluid from either end of the cylinder to the other.

In this modification, closing of switch 100 or 102 does not necessarily release the related brake. Operating unit 24' also has pressure switches 104 and 106 in the lines to the ends of the brake cylinder. The contacts 104a and 106a of switches 104 and 106 are connected in parallel with each other and in series with parallel-connected contacts 100a, 102a, and in series with solenoids 52a, to energizing electrical terminals 108. Both solenoid valves 52' are opened only when one of the pressure switches 100 or 102 is closed and when one of the pressure switches 104 or 106 is closed, so that the brakes of both operating units 16' and 24' are coordinated to initiate operation of both of those operating units concurrently. In this instance, each valve 52' and its associated cylinder unit 44 acts as a positive brake that is released in response to the large force that develops when the driving directions of the several actuators become resolved.

Apparatus using operating units having multiple code-responsive actuators may be energized in various ways. The driving energy for the various forms of driving units in FIGS. 3–7 is ordinarily hydraulic fluid, at a pressure great enough to operate the controlled-stroke actuators. This requires enough pressure to overcome the force exerted on the apparatus by the load plus the force needed to release the hydraulic brakes. In turn, the brake-releasing pressure is such as to hold each apparatus locked until the operating unit or units are in condition to drive the load and thereby to prevent the load from reversely operating the apparatus. In place of pressurized hydraulic fluid, compressed air could be used, if desired, for the code-controlled actuators in the embodiment of FIG. 6. And while practical considerations tend to limit the apparatus to operation by fluid pressure, in concept the actuators could be electromagnets, as shown in my Patent No. 3,283,918.

It is not essential that every actuator of an operating unit should be responsive to the control code. The operating unit in the apparatus of FIG. 3 involves actuators 36–38 as constituent driving parts, each of which responds to a code-controlled element. Similarly, in FIG. 6, actuators 84 are constituent parts that are subject to code control; but the operating unit in FIG. 6 additionally includes unit 91 that acts as a driver when switch 96 is closed, a driver that is not responsive to a part of the control code.

The brake-control valves 52 and 92 remain set so long as some of the actuators are being retracted while others are being extended, both in the case of the double-acting code-responsive actuators 36–38 of FIG. 6 and in the case of the single-acting code-responsive actuators 84 of FIG. 6. In each apparatus of FIG. 3 and FIG. 6, if the change from one position of the working end of the apparatus to the next position involves an elongation of the whole unit, then the brake in each case is released only after all the actuators that should retract have done so, and all other actuators that are undergoing a change are actuators approaching their extended states. Only then is there the high-pressure condition needed for releasing the hydraulic brake shown. Moreover, in the apparatus of FIG. 6 the brake is not released until the direction of drive has been resolved, even in case the operating unit as a whole is to contract. The direction of drive of all the constituent driving parts is resolved in that case when all the actuators 84 have reached their fully extended states; and at that time switch 96 closes and cylinder 91 is released as a brake and then acts as a driving part for contracting the entire multi-part unit.

Release of the brake in each case (in FIG. 3 and in FIG. 6 for both extending motions or contracting motions) occurs after the required direction of drive to the next position has been resolved among the constituent driving parts. Thereafter the apparatus operates in a direct stroke to the next position, free of vacillation.

What is claimed is:

1. Binary-code controlled apparatus, including a mechanical output device, and driving means for said output device comprising a group of actuators coupled in driving relation to said output device and operable individually between contracted and expanded states, binary control means for energizing selected ones of said actuators to assume or maintain one of said states while allowing another or others of said actuators to remain in or assume the other of said states, there often being a transition period during which certain of said actuators are contracting while others are expanding, and stabilizing means for arresting said actuators collectively against over-all change during such transition periods, the actuators becoming effective for driving the output device directly upon release of said arresting means.

2. Binary-code controlled apparatus in accordance with claim 1, including plural means for driving said mechanical output device in plural degrees of freedom, respectively, binary-code controlling means for each of said driving means, and plural stabilizing means as aforesaid for restraining motion of said output device in each of said degrees of freedom.

3. Binary-code controlled apparatus in accordance with claim 2, further including means for concurrently releasing said plural restraining means only after the directions of drive of said mechanical output device in all said degrees of freedom have been resolved.

4. Binary-code controlled apparatus in accordance with claim 1, wherein said actuators are selectively energizable under control of said binary control means to effect driving change from either of its states to the other, and said group of actuators being interconnected for driving the output device in either of two opposite directions.

5. Binary-code controlled apparatus in accordance with claim 1, wherein said actuators are selectively energizable to remain in or assume only one of said states and, when energized, act all in the same direction, said constituent parts of the driving means including a driver operable in the opposite direction and having means for controlling the supply of driving energy thereto.

6. Binary-code controlled apparatus in accordance with claim 5, further including means for sensing the flow of energy to said actuators to indicate completion of the selective operation thereof to said one state when the flow stops, said sensing means being arranged to cause said controlling means of said driver to transmit driving energy thereto.

7. Binary-code controlled apparatus in accordance with claim 1, further including means responsive to the rise of force produced by said actuators to a prescribed minimum level suitable to operate the apparatus when loaded for releasing said restraining means.

8. Binary-code controlled apparatus in accordance with claim 1, wherein said restraining means is a hydraulic cylinder having a piston and normally blocked means for admitting fluid to either side of said piston and discharging fluid from the other side of the piston, and means responsive to pressure built up in the hydraulic cylinder for opening said normally blocked means and thereby releasing said restraining means.

9. Binary-code controlled apparatus in accordance with claim 8, wherein said normally blocked means comprises a pair of oppositely acting pressure-relief valves each communicating with portions of the hydraulic cylinder at opposite sides of the piston.

10. Binary-code controlled apparatus in accordance with claim 8, further including pressure-responsive switches for sensing the pressure at each side of said piston and wherein said normally blocked means comprises solenoid valve means controlled by said pressure-responsive switches individually.

11. Binary-code controlled apparatus in accordance with claim 1, wherein said actuators are double-acting hydraulic cylinders and are interconnected so as to have the capability of driving the output device in either of two opposite directions.

12. Binary-code controlled apparatus in accordance with claim 1, wherein said actuators are single-acting fluid-pressure actuated cylinders selectively pressurized into accurately limited extended states arranged to act in the same direction, said driving means further including a clamping fluid-pressure-actuated cylinder arranged to act opposite to said direction.

13. Binary-code controlled apparatus in accordance with claim 12, further including means for sensing the flow of fluid to said selectively fluid-pressure-actuated cylinders to indicate completion of the selective operation thereof, and valve means controlled by said sensing means when said flow at least approaches interruption for initiating operation of said clamping cylinder.

14. Binary-code controlled apparatus in accordance with claim 1, including plural means for driving said mechanical output device in plural degrees of freedom, respectively, wherein said actuators are fluid-pressure-actuated cylinders, binary-code controlling means for controlling each of said driving means, and including plural hydraulic brakes for said driving means, respectively, each of said brakes having pressure-responsive release means.

15. Binary-code controlled apparatus, including a mechanical output device, and driving means for said output device comprising a group of actuators coupled in driving relation to said output device and operable individually between contracted and expanded states, binary control means for energizing selected ones of said actuators to assume or maintain one of said states while allowing another or others of said actuators to remain in or assume the other of said states, said actuators when energized in one combination driving said output device in one direction to one position and said actuators when energized in another combination driving said output device in said one direction to a second position beyond said one position, those actuators that are to change to one of said states from the other completing their changes during the transition period while at least one other of said actuators is undergoing only part of a reverse change of state, said actuators only then becoming fully effective collectively for driving the output device beyond said one position toward said second position, and means for arresting said actuators against collective change during any such transition period.

16. Powered apparatus for effecting successive driving strokes to various positions in either of two opposite directions, including a mechanical output device and means for driving said device from one position to a new position in its operating range in either of two opposite directions, said driving means comprising plural actuators, driving energy supply means and selectively operable elements for controlling the supply of driving energy to said actuators, said actuators each having an extended state and a retracted state and adapted to be driven by the driving energy of said supply means for assuming or maintaining either of said states in accordance with the selective operation of said controlling elements, said actuators being fastened to one another to effect driving operation in either direction, and stabilizing means for suppressing vacillation in the operation of said mechanical output device to a new position by said driving means, said stabilizing means comprising means for restraining said output device against moving until the direction of drive by said actuators has been resolved.

17. Powered apparatus in accordance with claim 16, wherein said restraining means is a brake having release means operable in response to the rise of the mechanical force of said driving means in either direction above a prescribed level.

18. Powered apparatus in accordance with claim 16, wherein said restrainining means comprises a hydraulic piston-and-cylinder unit connected to said mechanical output device and to a relatively fixed point, and pressure-relief valve means connected to said piston-and-cylinder unit and exposed to the fluid pressures at the opposite sides of the piston thereof for preventing the motion of said piston in either direction until the pressure at one side of the piston exceeds the pressure-relief level of said valve means.

19. Powered apparatus in accordance with claim 18, wherein said driving energy supply means is a fluid-pressure source and wherein said actuators are piston-and-cylinder units having pressure inlet connections from said fluid-pressure source controlled by said selectively operable controlling elements.

20. Powered apparatus including a mechanical output device, means for driving said device from one position to a new position, said driving means comprising plural actuators, driving energy supply means for said actuators, and selectively operable elements for controlling the supply of driving energy to said actuators, said actuators each having an extended state and a retracted state and operable to one of said states by energization, and a brake for restraining operation of said mechanical output device by said actuators and vice versa until sufficient driving force has been developed, said brake comprising a hydraulic piston-and-cylinder unit connected to said mechanical output device and to a relatively fixed point, and pressure-relief valve means connected to said piston-and-cylinder unit and exposed to the fluid pressures at the opposite sides of the piston thereof for preventing the motion of said piston in either direction until the pressure at one side of the piston exceeds the pressure-relief level of said valve means.

21. Powered apparatus in accordance with claim 20, wherein said plural actuators are adapted to produce a driving stroke in only one direction and wherein said driving means includes a clamping power actuator coupled to said output device and to said actuators for driving said output device in the direction opposite to that effected by said plural actuators and for reversing the states of any previously energized ones of said actuators when deenergized.

22. Powered apparatus in accordance with claim 20, wherein said plural actuators are adapted to produce a driving stroke in only one direction and wherein said hydraulic piston-and-cylinder unit is operable as a clamping actuator for operating said mechanical device in the direction opposite to that produced by said plural actuators and for operating at least certain of said actuators when deenergized out of the states previously assumed thereby when energized, and control means for effecting clamping operation of said hydraulic piston-and-cylinder unit after the selectively energized actuators have assumed their energized states.

References Cited
UNITED STATES PATENTS

| | | | |
|---|---|---|---|
| 2,656,049 | 10/1953 | Guyette | 214—1 |
| 3,422,967 | 1/1969 | Aron | 214—1 |
| 3,279,624 | 10/1966 | Devol | 214—1 |

GERALD M. FORLENZA, Primary Examiner

U.S. Cl. X.R.

91—67, 173; 92—9; 214—147